United States Patent
Geshwind et al.

(10) Patent No.: US 8,243,123 B1
(45) Date of Patent: Aug. 14, 2012

(54) THREE-DIMENSIONAL CAMERA ADJUNCT

(76) Inventors: David M. Geshwind, New York, NY (US); Anne C. Avellone, New York, NY (US)

(*) Notice: Subject to any disclaimer, the term of this patent is extended or adjusted under 35 U.S.C. 154(b) by 1656 days.

(21) Appl. No.: 11/347,121

(22) Filed: Feb. 2, 2006

Related U.S. Application Data (60) Provisional application No. 60/650,040, filed on Feb. 2, 2005.

(51) Int. Cl.
*H04N 15/00* (2006.01)
*H04N 13/00* (2006.01)
*A61B 1/04* (2006.01)

(52) U.S. Cl. .............. 348/42; 348/47; 348/48

(58) Field of Classification Search .......... 348/42, 348/E13.002–E13.005, E13.022, E13.044, 348/E13.068, 47, 48; 382/154
See application file for complete search history.

(56) References Cited

U.S. PATENT DOCUMENTS

| | | | | |
|---|---|---|---|---|
| 4,807,024 A | * | 2/1989 | McLaurin et al. | 348/50 |
| 4,925,294 A | * | 5/1990 | Geshwind et al. | 352/57 |
| 6,266,068 B1 | * | 7/2001 | Kang et al. | 345/629 |
| 6,512,892 B1 | * | 1/2003 | Montgomery et al. | 396/326 |
| 7,583,391 B2 | * | 9/2009 | Lu | 356/601 |
| 2002/0095613 A1 | * | 7/2002 | Matsuoka et al. | 713/400 |
| 2002/0190991 A1 | * | 12/2002 | Efran et al. | 345/475 |
| 2003/0067537 A1 | * | 4/2003 | Myers | 348/47 |
| 2004/0104935 A1 | * | 6/2004 | Williamson et al. | 345/757 |
| 2005/0017968 A1 | * | 1/2005 | Wurmlin et al. | 345/419 |
| 2005/0259147 A1 | * | 11/2005 | Nam et al. | 348/43 |
| 2006/0003111 A1 | * | 1/2006 | Tseng | 428/16 |

* cited by examiner

*Primary Examiner* — Lin Ye
*Assistant Examiner* — Euel Cowan
(74) *Attorney, Agent, or Firm* — UNIPAT.ORG; Anne C. Avellone; David M. Geshwind (57) ABSTRACT

Additional cameras, optionally in conjunction with markers or projectors, capture three-dimensional information about the environment and characters of a filmed scene. This data is later used to convert, generally as a post-production process under highly automated computer control, or as a post broadcast process, a relatively high quality two-dimensional image stream to three-dimensional or stereoscopic, generally binocular, format.

52 Claims, 9 Drawing Sheets

THREE-DIMENSIONAL CAMERA ADJUNCT

CROSS-REFERENCE TO RELATED APPLICATIONS

The instant application claims priority from provisional application 60/650,040, filed Feb. 2, 2005 which is hereby incorporated, in its entirety, by reference. Related U.S. Pat. Nos. 4,925,294 and 6,590,573, and copending application Ser. No. 11/344,748 entitled improved Rendering for Three-Dimensional Motion Pictures, filed Jan. 31, 2006 are also all hereby incorporated, in their entirety, by reference.

COPYRIGHT NOTICE

A portion of the disclosure of this patent document contains material which is subject to copyright protection. The copyright owners have no objection to the facsimile reproduction by anyone of the patent document or the patent disclosure, as it appears in the Patent and Trademark Office patent file or records, but otherwise reserve all copyright rights whatsoever. In particular, the graphics, designs and text herein, in addition to any patent rights, are also covered by copyright and/or trademark. Permission to copy those materials is solely limited to their use in conjunction with the lawful distribution of this patent document and all other rights, including their publication, are reserved.

BACKGROUND OF THE INVENTION

1. Field of the Invention

Generally, additional cameras, optionally in conjunction with markers or projectors, capture three-dimensional information about the environment and characters of a filmed scene. This data is later used to convert, generally as a post-production process under highly automated computer control, or as a post broadcast process, a relatively high quality two-dimensional image stream to three-dimensional or stereoscopic, generally binocular, format.

2. Description of Related Art and Scope of Invention

The present invention is particularly useful when used in conjunction with the methods and devices disclosed in Applicant Geshwind's prior issued patents U.S. Pat. No. 4,925,294 and U.S. Pat. No. 6,590,573, as well as similar, later filed patents.

Additionally, Applicant Geshwind has proposed a medical imaging technique for converting, in essentially real time, images being gathered from a single fiber-optic endoscope (optionally, employing multiple optical cables) for 3D stereoscopic display. This technique projects a grid, pattern of dots, or some other known pattern on the viewed field. This known pattern is distorted by the viewed field and, when scanned by a computer through one of the fiber optic channels, the distortion can be used to create a mathematical representation of the shape of the field in 3D space. The 2D image of the field of view, delivered through the same or another fiber channel, is then distorted by skewing, etc. to create a left eye view—and a right eye view in a second image, with roughly opposite distortions—for stereoscopic viewing. Alternately, one of the two views presented is the undistorted view. However, for precision, it is suggested that complementarily distorted left and right views will provide better perceptual balance for stereopsis. General (white) illumination is also supplied. These light sources and views may be sent down one or several different fibers. The two types of imaging (the grid or other pattern for computer viewing vs. white illumination for human viewing, either directly as 2D or, after computer distortion, as 3D) are optionally time division multiplexed in such a way so that they do not interfere with each other, and may, optionally, share an optical cable. Display of the grid is, generally suppressed from the human display; although, a display with a grid overlay will, optionally, be provided, in the event that it proves to have some utility for the human operator.

This proposal was made because, during endoscopic procedures it was believed that it is not practicable, space-wise, to have a second camera, fiber or POV that is conveniently disparate from the first, to provide appropriate stereopsis. Further, this technique was motivated because real-time, non-image-conversion-operator-assisted, non-post-production, and essentially accurate stereo imaging is required for surgery and other internal procedures to be performed. The primary entertainment applications of the invention described in '294 were contemplated as a post-production process where 3D depth was, generally, at least in part, provided or adjusted by a human operator to achieve artistically appropriate results, rather than to achieve scientific accuracy. That entertainment process was, therefore, without enhancement, not fast or accurate enough for medical applications.

in the present invention, however, we are now using images from multiple camera POVs, in a post-production process, to save money and reduce labor (not necessarily eliminate it); and, to shorten post-production time, not to necessarily achieve real-time imaging. We are doing this to electively avoid using dual typical 'Hollywood' cameras, not because a dual-camera set-up is impossible or even technically infeasible. The desired result is to be able to add 3D as a post-shooting-designed and adjustable effect, with scientific accuracy and 3D reality as a starting point, not as a goal.

Applicant Geshwind also describes, in U.S. Pat. No. 6,590,573 a technique whereby a 2D image stream and a depth map image stream are delivered as, for example, by broadcast television means and, in essentially real time, the two are processed after reception to create a stereoscopic display.

One other related piece of art that Applicant's became aware of subsequent to filing 60/650,040 is for a *Hybrid Stereo Camera: An IBR Approach for Synthesis of very High Resolution Stereoscopic Image Sequences* by Sawhney, et al, SIGGRAPH 2001, Proceedings of the 28th Annual Conference on Computer Graphics, Los Angeles, Calif., USA. ACM, 2001, pp. 451-460.

That technique, in essence, captures, along with a first high-resolution image stream, a second low-resolution image stream. It primarily employs that second image stream as a 2D map upon which to overlay the high-resolution detail data from the first high-resolution image stream, by distorting that first image steam employing 'morphing' or 'optical flow' or similar techniques. Additional details of implementation do not change that fact that (the problem of the size and cost of the second camera aside) none of the problems addressed by the present invention are eliminated, for example:

the two cameras still have to be knowledgeably and correctly adjusted for artistic, dramatic and technical requirements, and for comfort of 3D display/viewing, prior to shooting, and a non-adjustable commitment is made;
  post-production processing is still required (as, generally, with the present invention) to produce the second image from the first;
  the complexities of digital or optical compositing are worsened, rather than lessened or eliminated;
  quality is still degraded compared with shooting full dual-camera stereo;

only one eye image stream is processed, is potentially anomalistic, and is lower quality throughout.

In addition, there are a host of long-standing motion capture techniques (optical, radio and strain-gage suits), used to capture the position and configuration of characters (as well as other elements); and, motion control techniques that capture model and camera position, orientation and optical configuration. These are primarily used to integrate live action visual elements or motion, with fully computer animated or partially computer synthesized (CGI) visual elements in a coordinated manner. Most recently the fully computer animated film Polar Express, and the CGI films Lord of the Rings (Trilogy) (the character Gollum) and King Kong (the character King Kong) used motion capture techniques to capture live performances for animated characters to great effect and praise. Films such as the various Star Wars and Matrix films, etc., utilize the more general motion control and CGI techniques to integrate live and synthetic visual elements.

Further, there are currently a number of cameras that are usable or adaptable as sub-systems of the present invention that capture 3D shape. And, there are commercially available laser scanning cameras that replicate the process used to capture shape for "solid photography."

Finally, there are extant algorithms for extracting 3D scene and camera position information from multiple POV images shot essentially simultaneously, as well as from even single cameras if in motion.

Also, see the comparable sections of Applicant Geshwind's prior issued patents (in particular, U.S. Pat. No. 6,590,573 and U.S. Pat. No. 6,661,463) for a discussion of relevant related art.

Practitioners of the instant invention are computer scientists, engineers and/or filmmakers with a high degree of technical training and are fully familiar with methods and systems that perform: image capture (film and video cameras and recording devices); image digitization; image processing (by both digital and film methods); digital image synthesis and computer graphics; image compositing; image output, display and recording; etc. In particular, these include digital image processing systems of high performance and high resolution employing digital signal processing hardware and frame stores, stereoscopic cameras of all (and, in particular large-screen) formats, stereoscopic 3D image rendering, and 2D to stereoscopic 3D image conversion (hereinafter "2D to 3D conversion").

The intended practitioner of the present invention is someone who is skilled in designing, implementing, building, integrating and operating systems to perform these functions; and, in particular, is capable of taking such systems and integrating new image processing algorithms into the operation of an otherwise extant system.

It is noted that much of the technology described herein is already in use for motion capture for computer animation and CGI effects. In the present invention we now use this technology to enhance 2D to 3D conversion of motion pictures.

Many of the technical elements disclosed herein are standard and well known methods or devices. The details of building and operating such standard systems, and accomplishing such standard tasks, are well known and within the ken of those skilled in those arts; are not (in and of themselves, except where noted) within the scope of the instant invention; and, if mentioned at all, will be referred to but not described in detail in the instant disclosure.

Rather, what will be disclosed are novel techniques, algorithms and systems, and novel combinations thereof, optionally also incorporating extant techniques, algorithms and systems. The results are novel single or composite techniques, algorithms and systems and/or novel purposes to which they are applied and/or novel results thereby achieved.

In summary, the disclosure of the instant invention will focus on what is new and novel and will not repeat the details of what is known in the art.

DETAILED DESCRIPTION OF PREFERRED EMBODIMENTS WITH REFERENCE TO THE DRAWINGS

Motivation for an New Approach to Stereoscopic Motion Picture Production

As an inventor and purveyor of computerized services to convert 2D motion pictures for 3D (stereoscopic) display systems, it was expected that this process would be used primarily to convert film or video material that had already been shot in standard 2D format. That is, it was expected that for productions which were shot from scratch, with the intention to display them in 3D format, they would be shot in 3D to begin with.

However, as it turned out, public interest in 3D took longer to develop and, by that time, the cost has dropped, and the sophistication and availability have increased for computer image processing services. Meanwhile, the costs, sophistication and availability of 3D motion picture technology have not kept pace.

Therefore, even for motion pictures where before production begins, the decision has been made to display them in 3D in at least some venues, the practice has developed to shoot the film (or video) in standard 2D fashion, utilizing all of the myriad of computer and other imaging technology, and to convert the motion picture to 3D as a post-production process. This has come to pass because, among other reasons:
  shooting in 3D, especially for high-budget Hollywood type productions is very expensive;
  the equipment for shooting in 3D is not widely available;
  3D cameras are much larger and harder to operate, especially for large formats such as IMAX®;
  3D computer generated material takes, generally, twice the time to render;
  the art of designing the visual look for 3D is not well understood by directors and cinematographers;
  the science of achieving the visual look for 3D is not well understood by directors and cinematographers;

the style of producing motion pictures that comprise live, computer generated, and other elements, often shot at different times and/or in different places, optically or digitally composited, only increases these difficulties;

shooting and reviewing dailies would slow drastically, only increasing costs further;

there are very few industry people schooled in the required techniques;

results would often be unsatisfactory looking unrealistic, or causing discomfort in the audience;

scene to scene consistency is hard to achieve;

the desired results would not always be reasonably achievable; and, the ability to adjust 3D or depth effects is not possible once live action 3D is shot without expensive and complex computer image processing, if at all.

All of these problems are overcome (while others are introduced) by shooting motion pictures in 2D and adding a stereoscopic depth effect as a post-production process. In particular, for each scene, or even shot or frame, the depth effect for each element can be designed and adjusted (departing from reality where advantageous) for the artistic, dramatic or technical effect desired and required; and, a coherent, realistic and 'comfortable to view' 3D result can be achieved.

However, the above notwithstanding, 2D to 3D conversion is also an expensive and complex process. It is hard to achieve a coherent, realistic and 'comfortable to view' 3D result. Further, the greatest cost of such conversions is presently the labor of the operators whose job it is to identify and separate objects, and to design and specify 3D or depth information. The results of the human efforts are then utilized by computers to produce the conversion process.

In addition, as currently practiced, the conversion process takes significant time, and it is desired to release the standard 2D and enhanced 3D versions of a film 'day and date' (that is, essentially at the same time). Since films are often being edited and otherwise adjusted until just before release, sophisticated layering of diverse visual elements makes the delivery process more complex, final print materials are, thus, not available with sufficient lead time to reasonably and cost effectively achieve 'day and date' release.

It is thus an object of the present invention to provide methods and devices that will provide information that can be used in lieu of much of the object boundary and depth information currently supplied by human operators (complete depth information subsumes boundary information); and, to do so in a more accurate, detailed, appropriate and realistic manner. Thus, decreased costs and/or improved results and/or faster results will be achieved.

Basic Invention

The basic invention can be described as comprising the following elements, with variations and options to be described further below:

a relatively standard camera is utilized to film scenes in as close to customary fashion as possible;

by the use of additional (optionally low-resolution) image capture cameras, special image sensing cameras, or other means, 3D character and environmental data is captured;

these other cameras are optionally coordinated with the main camera position and/or orientation, its optical lens configuration, or not, and, are also optionally separately mounted or fixed within the environment, location or set;

the 'other means' can, optionally, include patterns projected by optical laser or other methods, passive or active optical markers, radio markers, etc., which, again, are optionally coordinated with the main cameras, separately controlled, or fixed;

the result is a single high-quality image stream that is, optionally used for 2D display;

additional results are, optionally, one or more additional (generally lower resolution or lower quality) visual image streams;

additional results are, optionally, one or more additional image streams that comprise captured projected pattern and/or marker data that are analyzed to create 3D data;

additional results are, optionally, one or more additional sources of non-image stream 3D data, such as camera or model motion control or radio motion capture data;

3D data sources are computationally coordinated to obtain 3D shape and position information for objects and environmental features, as well as optional object segmentation information;

a companion (left OR right) image is created to complement the main data stream, or two (left AND right) images streams are created from the main data stream. Additionally, more than two image streams are created (for lenticular data for example); or, a generalized 3D database (3D shape, and textures from the visual image stream(s)) is constructed for holographic imaging, VR, interactive video, videogame or other purposes;

the above are made by shifting and distorting areas of the main image stream, but are, optionally, also produced by referencing, incorporating or enhancing portions of auxiliary visual image streams, for example especially for filling holes created by dis-occlusion of objects in the main visual image stream as objects are shifted and distorted.

Additional Cameras

This invention is meant to, as much as possible, in some embodiments, not interfere with film and television directors and crews using standard equipment in standard ways without additional training or designing for 3D. We will refer to the standard film or television camera as the main camera, and we will refer to additional cameras used for the instant invention as auxiliary, adjunct or additional cameras. Further, auxiliary or adjunct data may be collected by other means, such as radio, from motion capture sub-systems, etc. In some embodiments, there will be multiple cameras, but there will not be a specific distinction of one as the main camera and others as auxiliary cameras. In those cases there will just be multiple cameras capturing image data, and/or 3D data.

Image, motion picture, image data, and image stream will often be used interchangeably, unless a specific nuance is implied, and refer to pixel arrays of image data in single frames or, more generally, strings of such frames. Such might be viewed by an audience and recognized as a motion picture, even if of low quality.

3D data, information, data streams, camera output, or images or streams, refers to data (which may comprise images of grids, dots, etc., or also include radio or other telemetric data) that can be transformed into 3D position or shape information. If viewed, such data would not generally be recognized as a usual entertainment presentation by an audience.

Additional cameras are optionally of relatively standard imaging type (film or video or digital image sensor) collecting black and white or full color motion picture streams. Generally these will be relatively small so as not to interfere with the main camera. They will be used for one or more of the following purposes.

They are optionally used to capture image data that will be used as a guide to distort the image from the main camera to produce one or more stereo images, as per Sawhney, et al., for example. In that regard, selected portions may also be used to 'hole fill' where appropriate image data from the main camera is not available.

They are optionally used to capture image data that will be used, in conjunction with the main camera image stream, or other auxiliary camera image streams, to computationally extract 3D or depth information by comparing the two (or more) image streams. This is done by comparing images from multiple POVs at a relatively single time; or, several image frames over time are compared (from one or multiple source POVs) as objects, and especially the camera, move, to obtain 3D position and/or motion data about objects (characters) the environment (set) and/or the camera.

Additional cameras (and, optionally the main) optionally capture 3D data instead of, or in addition to image data. Such image sensors may be of usual visual type, or may sense, for example, visible or invisible infra red, be monochromatic, of various resolutions and, in particular, may be high speed and/or high-sensitivity, capturing 3D data 'between frames' that are being shot of more standard visual information.

Figure 4:
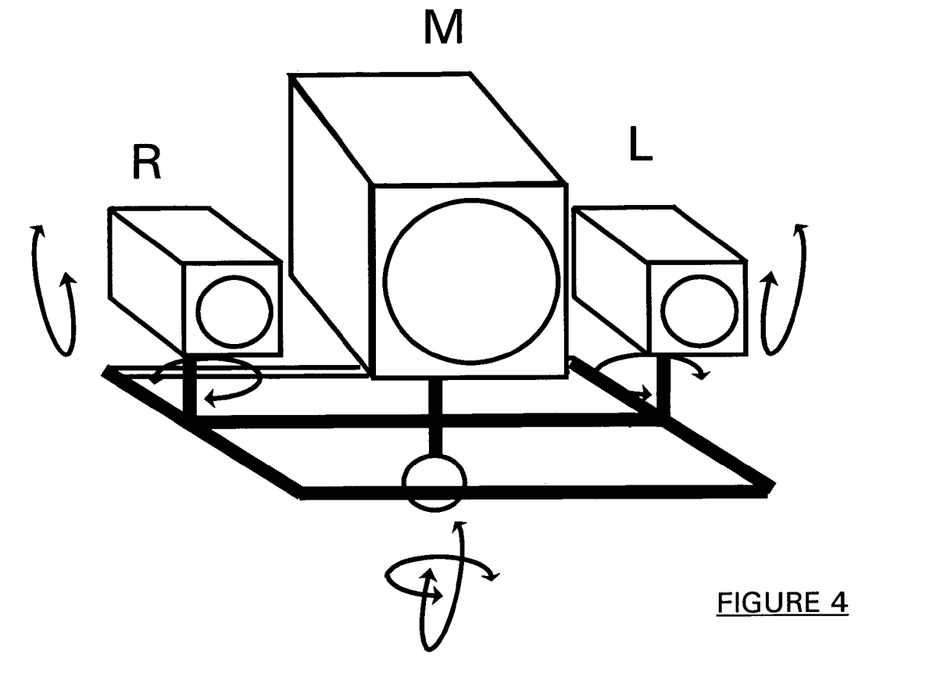
FIGS. 4/4A depicts a main camera, and left and right (and vertically separated) auxiliary cameras.
Figure 4A:
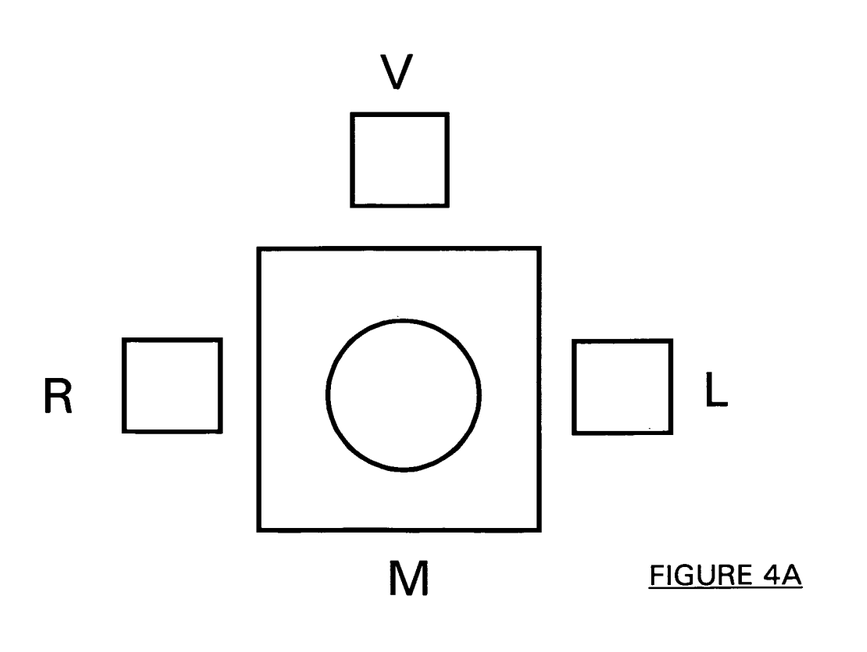

While it is utile to have a 3D data camera capture information from the same POV as the main visual image camera (and this may be approximated mechanically or, via sharing of the same optical path by the use of mirrors or prisms, made identical) more generally, the auxiliary cameras will be spatially separated from the main camera. They will often be:
  the complement of a pair (left OR right) with the main camera;
    a pair (left AND right) around the main (center) camera; or,
    can even be vertically separated to compute 3D from vertical parallax.
  See FIGS. 4 and 4A. Further, they can be:
    mounted on or with the main camera so that they move with it (both positionally and/or orientationally);
    in addition (especially a pair) may converge as the camera lens is reconfigured (e.g., zoomed);
    the lens(es) of the auxiliary camera(s) may also track focus and/or focal length (zoom) of the main lens, or they may stay wide (or multiple cameras optionally capture wide and close);
    auxiliary cameras are also, optionally, placed separate from the camera, viewing or inhabiting the 'set,' and are fixed or, more generally, remotely controlled and, optionally, tied (slaved) to motion control data from the main camera. See FIG. 6.

It will, in some embodiments, be beneficial to have the focal length of one or more, and/or the convergence of a pair of, auxiliary cameras be appropriately coordinated with the focal length (zoom) of the main camera. In this way, the 3D information so derived will already be tracking the 2D composition of the main image stream.

Alternately, in other embodiments, is will be beneficial for the auxiliary image streams to be collecting information outside a narrow field of view so that 3D information of the entire scene will be captured. This is particularly true if there is more than one 'main' camera, as is often the case with theatrical motion pictures where, for example, a wide shot and two close up shots focusing on two actors are shot simultaneously, or an action, explosion or stunt shot will be covered by several cameras. In such cases, each main camera may have its own auxiliary cameras (and/or projectors) associated with it, or auxiliary cameras will, alternately, take in the 3D information for the entire scene which will then be utilized, from an appropriate direction and at an appropriate focal length for each main camera image stream.

Ideally, capturing 3D information (or the auxiliary information from which 3D information can be derived) for both the global scene, and also associated with the dynamic view of each main camera, provides the kind of multiple POV coverage for 3D information as well as for visual image information.

Generally, auxiliary cameras are supplied in pairs to provide parallax information; or, they are supplied singly, to be used in conjunction with a main camera, or with projected geometric patterns to derive 3D information.

It is noted here that, to create 3D, rather than creating a right from the left, or a left from the right, it is, optionally, beneficial to create a left from the center, and a right from the center. In this way, two presented views are both synthetic, and the distortion applied to either one is half as much (in opposite directions) than if a single synthetic view is used. They may each be less correct than the original, but they will be comparable, and thus will not provide a lopsided sensation. They may each require more work than simply reusing the original for one eye, but almost certainly require less work and/or anomaly than performing a larger distortion for the other eye. And, they may each contain more error than simply reusing the original for one eye, but almost certainly contain less error than performing a larger distortion for the other eye. Further, when a director critically aligns visual elements, creating left and right images maintains the POV, while creating only one shifts the audience POV, which will skew such critical alignments.

Capturing 3D Data from Additional Cameras

As already discussed, motion control and motion capture are well developed techniques used for other purposes, and the data so collected may be integrated into the present invention to augment 3D data collected as follows.

Nevertheless, it is generally intended that the present invention will most often comprise one or more cameras (often a stereo pair, but not necessarily so) to capture 3D shape and position data in the following manner. First, however, it should be noted that applicant has noted during work on earlier 2D to 3D conversion that much of 3D perception is due to texture, lighting, shading and other information inherent in the original 2D image stream. It takes surprisingly little 3D information to distort a 2D image steam into a pair (one old and one new, or two new) of image streams that exhibit convincing stereopsis.

For many embodiments of the present invention, a known geometric pattern will be projected upon the characters, props and/or environmental elements that are being photographed.

Figure 1:
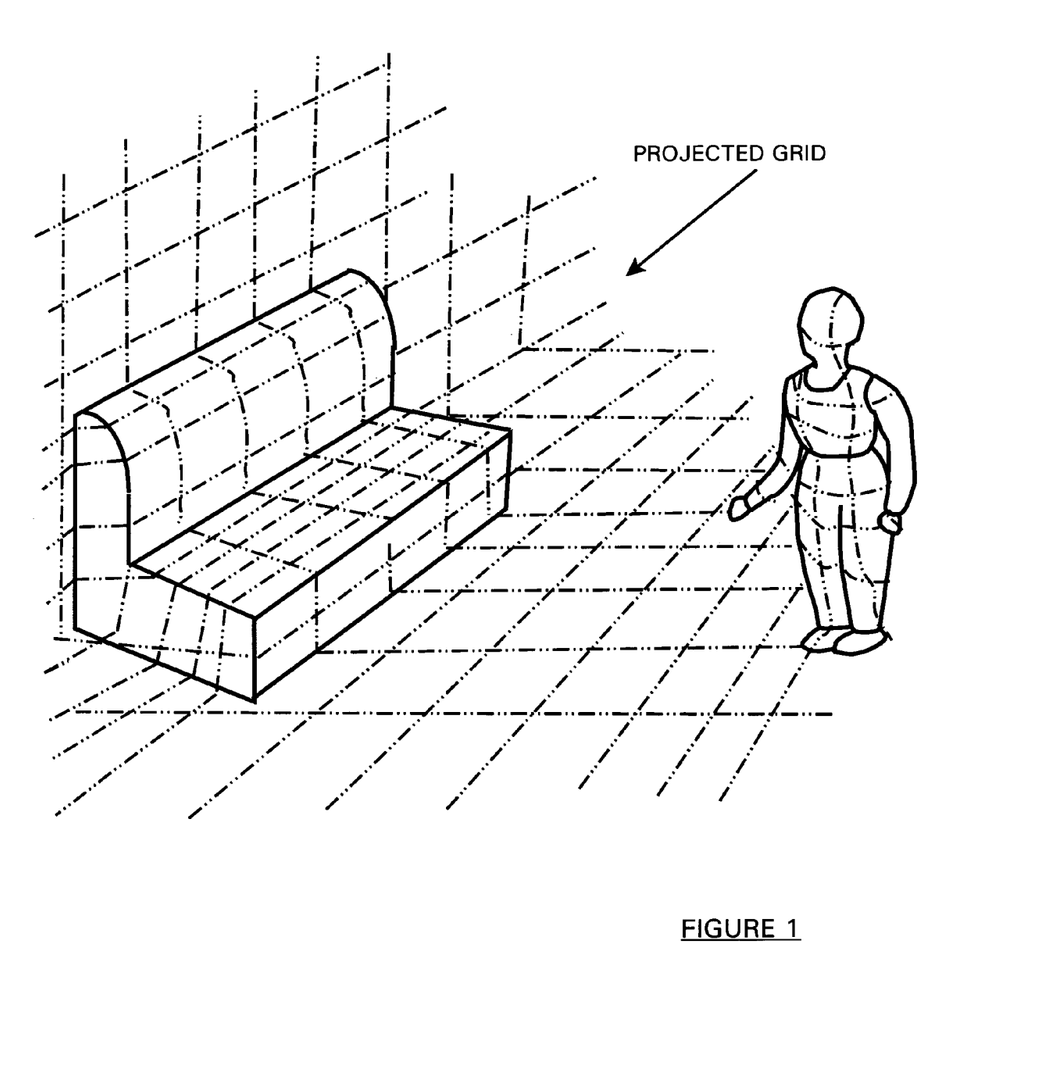
FIG. 1 depicts a grid projected onto a scene to be filmed.
Figure 5:
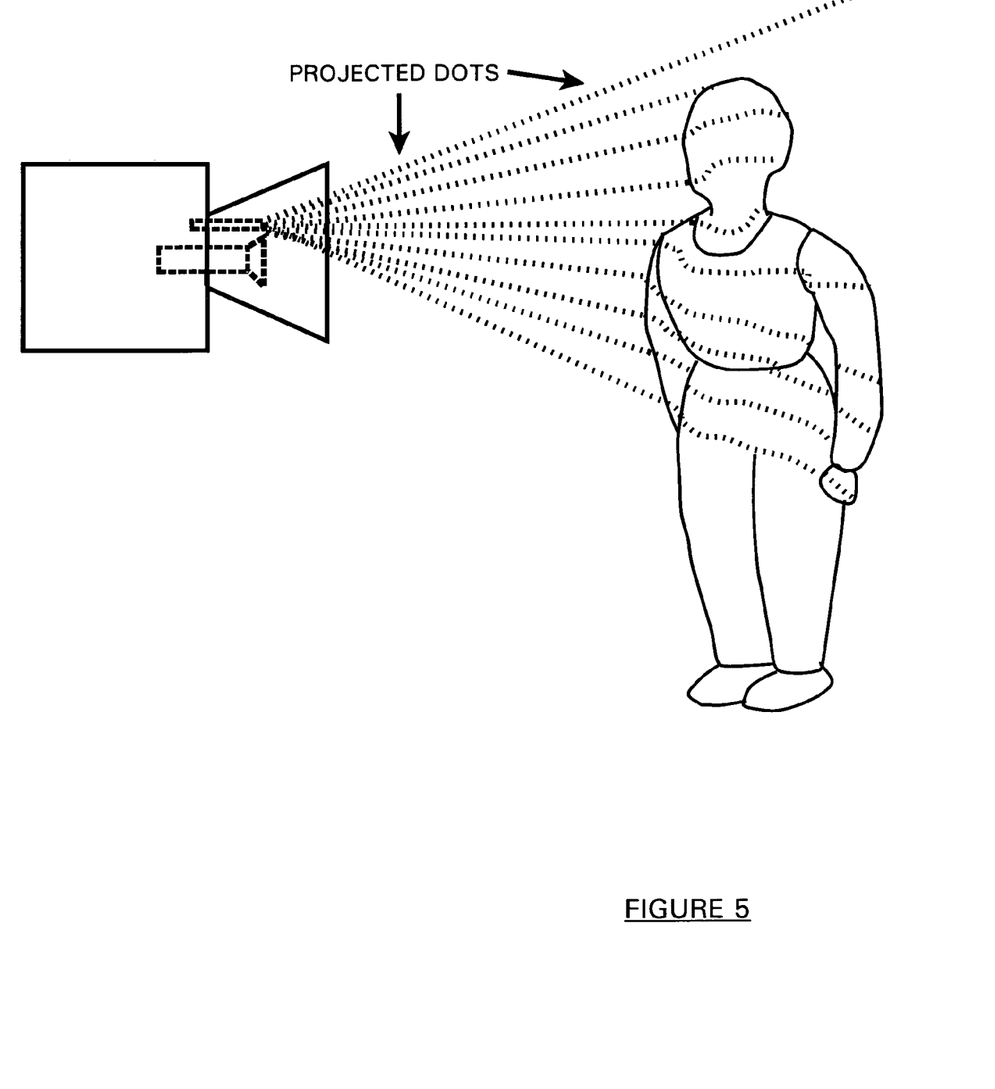
FIG. 5 depicts a camera/projector utilizing a pattern of dots for 3D data collection.

See FIGS. 1 and 5. The way that these geometric patterns are distorted as they fall on the objects being photographed are used to reverse compute the shape and position of the objects, in 3D space, that would cause such distortion. The computations are made less ambiguous by, optionally, utilizing more than one camera to image the geometric patterns; and/or by, optionally, projecting patterns from more than one projector location for a sort of 'triangulation.'

Figure 2:
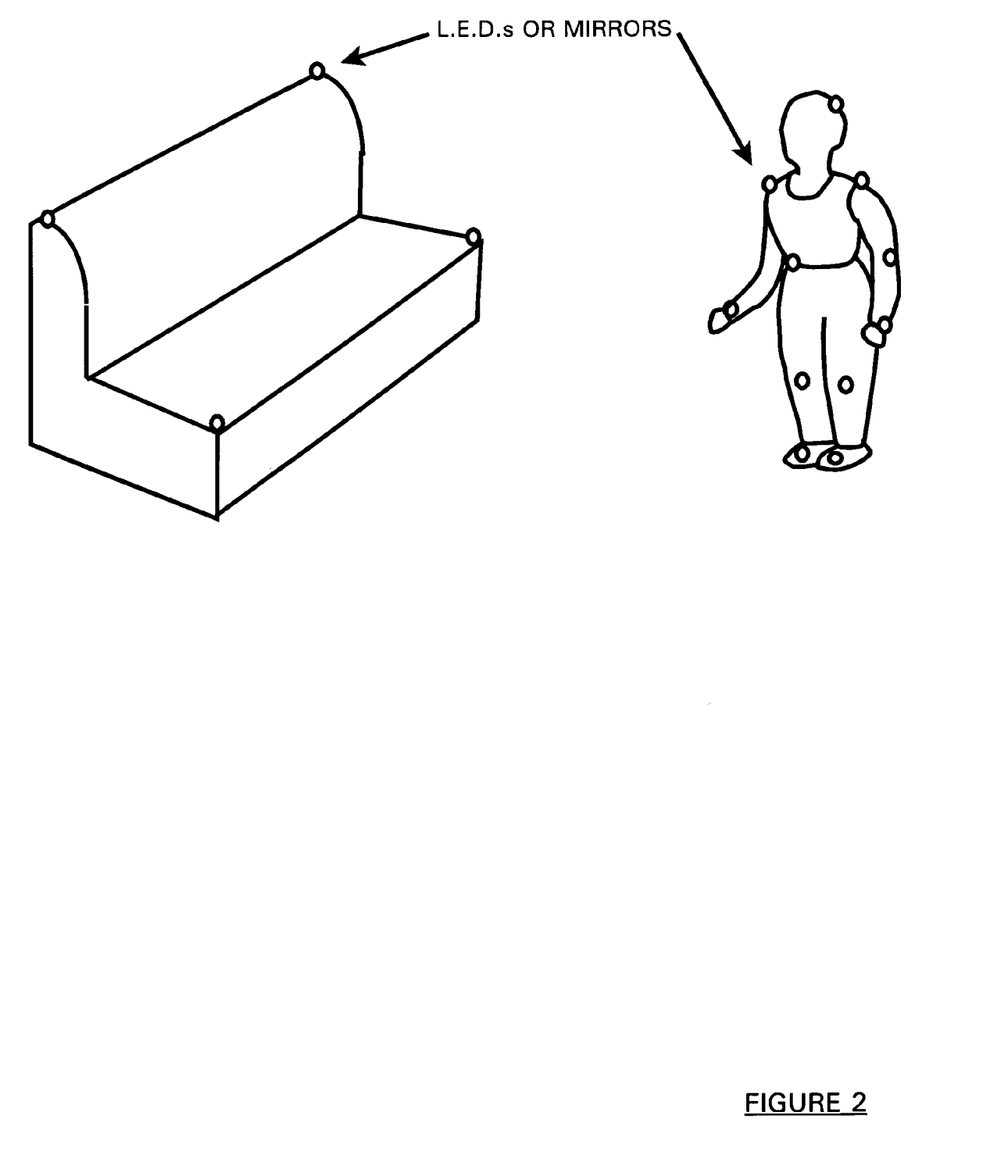
FIG. 2 depicts passive or active markers incorporated into a scene to be filmed.

Projection may be optical, laser scanned (e.g., oversized barcode scanners), or any other means. And, passive (e.g., mirrors) or active (e.g., LEDs) markers on key points (e.g., corners, edges, centers, protrusions) of fixed set elements and props, or key points (e.g., human joints, wheels) of characters or mobile or configurable props, will be, optionally, integrated. See FIG. 2.

Especially when more than one projector is utilized (but also for distinct parts of a pattern from a single projector) entire patterns or parts of patterns are distinguished by:
  different shapes, sizes or orientations of 'dots';
  different thicknesses, repeat patterns, or perturbations of lines;
  different visible colors, or invisible frequencies (e.g., IR bands);
  different times of visibility (during one frame time, or during different frame times).

As with the auxiliary cameras, projector positions are different in different embodiments. The projectors are, optionally:
  co-mounted with the main camera and/or auxiliary camera(s);
  remotely located, but slaved to the main or auxiliary camera orientation or position;
  tied into the field of view or focal length of the appropriate camera;
  fixed and/or entirely (geometrically, not temporally) independent of camera operation;
  in particular, projectors from the (roughly) sides or top or bottom, rather than from the front, of the set, that scan patterns (for example) from front to back over time, will provide easily extractable 'Z' data (contours); however, clue to occlusion, several such projectors/scanners may need to be dispersed within the set. See FIG. 8, where only lines at T7, and T9 through T14 are visible to the IR camera.

Figure 3:
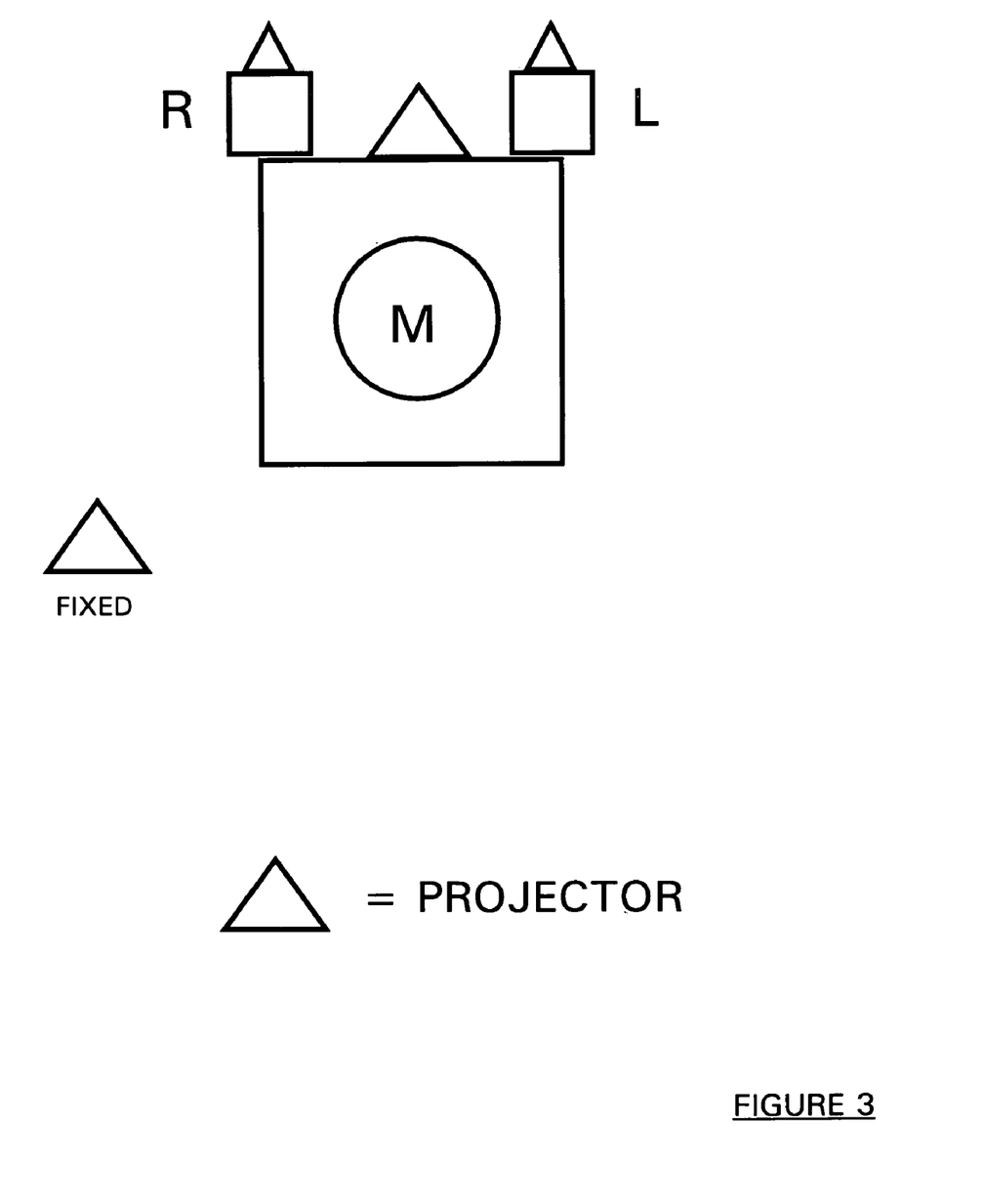
FIG. 3 depicts main and auxiliary cameras, and both fixed and mounted projectors.
Figure 6:
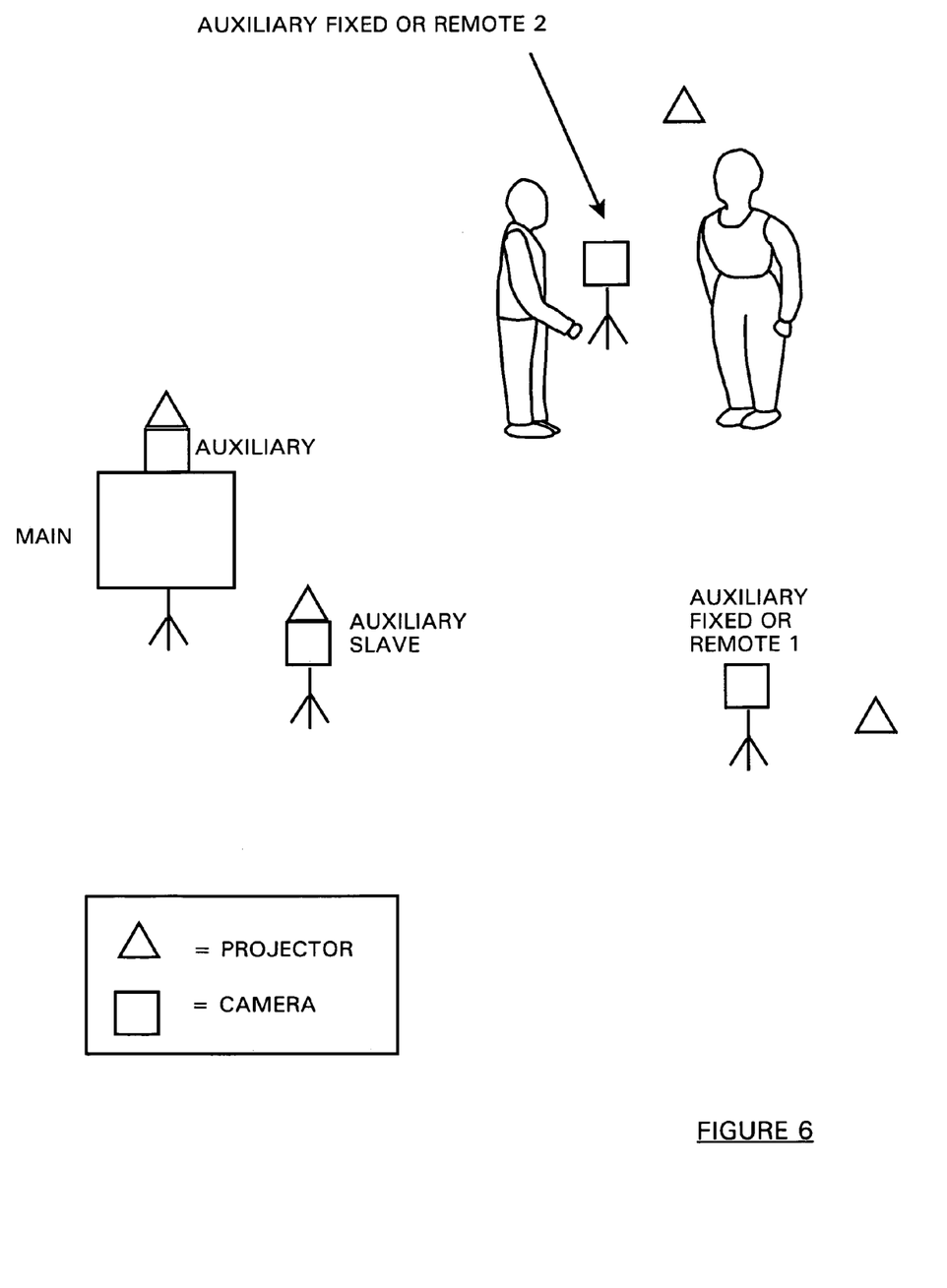
FIG. 6 depicts a scene with a main camera and auxiliary cameras that are mounted, slave and at two remote or fixed locations within the set, as well as projectors.
Figure 8:
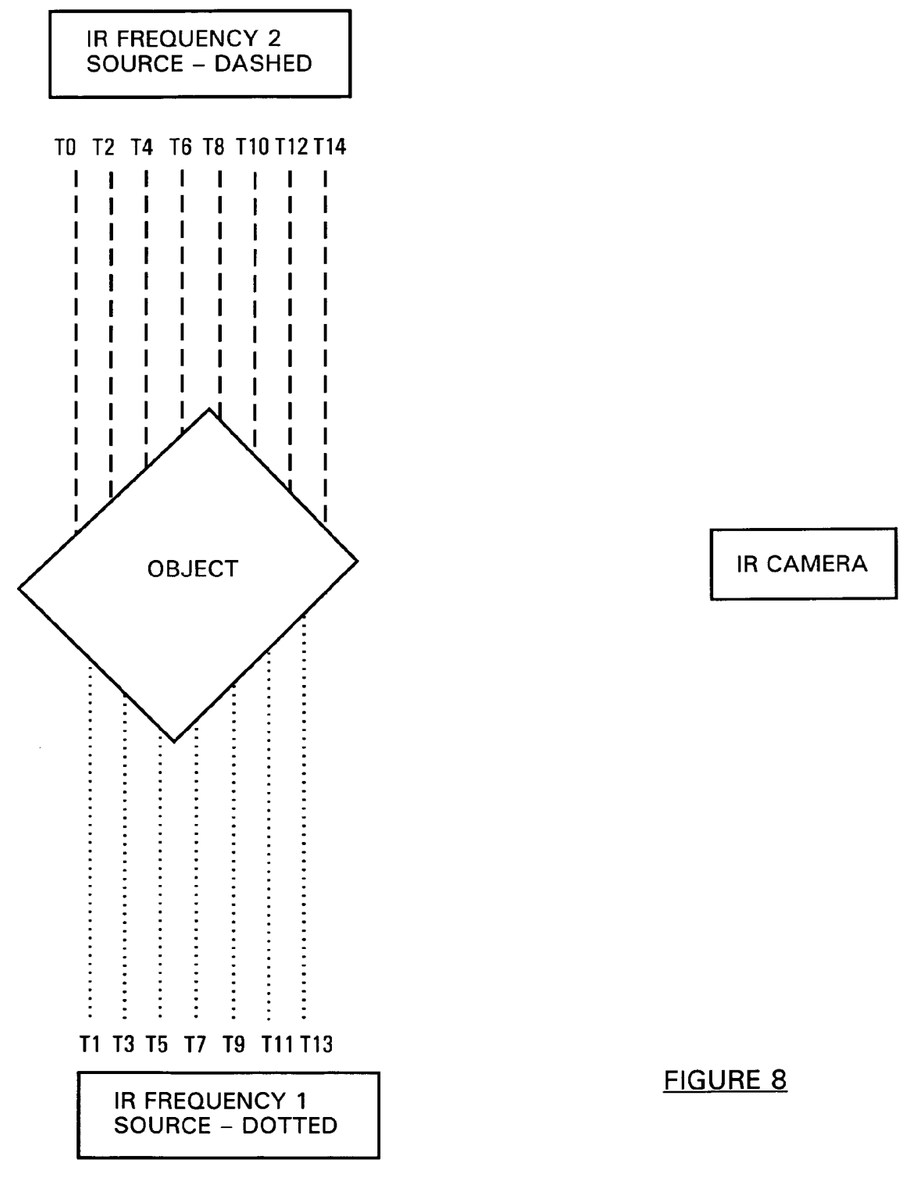
FIG. 8 depicts side scanning producing contours distinguishable by frequency, timing or line geometry.

See FIGS. 3, 6 and 8.

Preferred Embodiment Operation

During filming, the scene is lighted as normally would be for the main film camera. In addition, a projected or laser-scanned pattern—optionally infra-red, or of some other spectrum that will not annoy or injure the actors, or impact the film—is projected or scanned onto the scene and, optionally, illuminated sources (e.g., IR LEDs) or reflectors are put within the set/scene or on actors (as in motion capture). All of this auxiliary invisible data image stream is captured by one or more, generally a stereo pair of, auxiliary cameras.

In order to protect the exposed film frames, it is further suggested that, optionally, the projected or laser scanned pattern, as well as the illuminated sources embedded in the set, are made 'active' only during the period when the film camera shutter is closed, during film advance. (For digital video image sensors, this is less likely to be an issue.) The timing will then be ½ frame off between the captured RGB film image, and the dual video IR data capture image pairs.

Especially if the final stereoscopic filth is to be projected and viewed with LCD shutter-glasses, the left and right eyes will, optionally, have interleaved timing values anyway. Thus, for the distortions, it will actually be advantageous to similarly synchronize the distortion shapes. This is, optionally, done by interpolating between times of the captured IR stereo data frames.

Alternately, the imaging is timed as follows, which will provide ½-frame shifts between the left-eye and right-eye data cameras, and which are each shifted, in opposite temporal directions, from the time the corresponding high-resolution film frame is exposed. In the image below L=Left Data Image, R=Right Data Image, M=Monoscopic (High-Resolution, Main) Film image.

```
.|.L..M..R.|.L..M..R.|.L..M..R.|.
 | FRAME N  | FRAME N + 1 | FRAME N + 2 |
```

Figure 9:
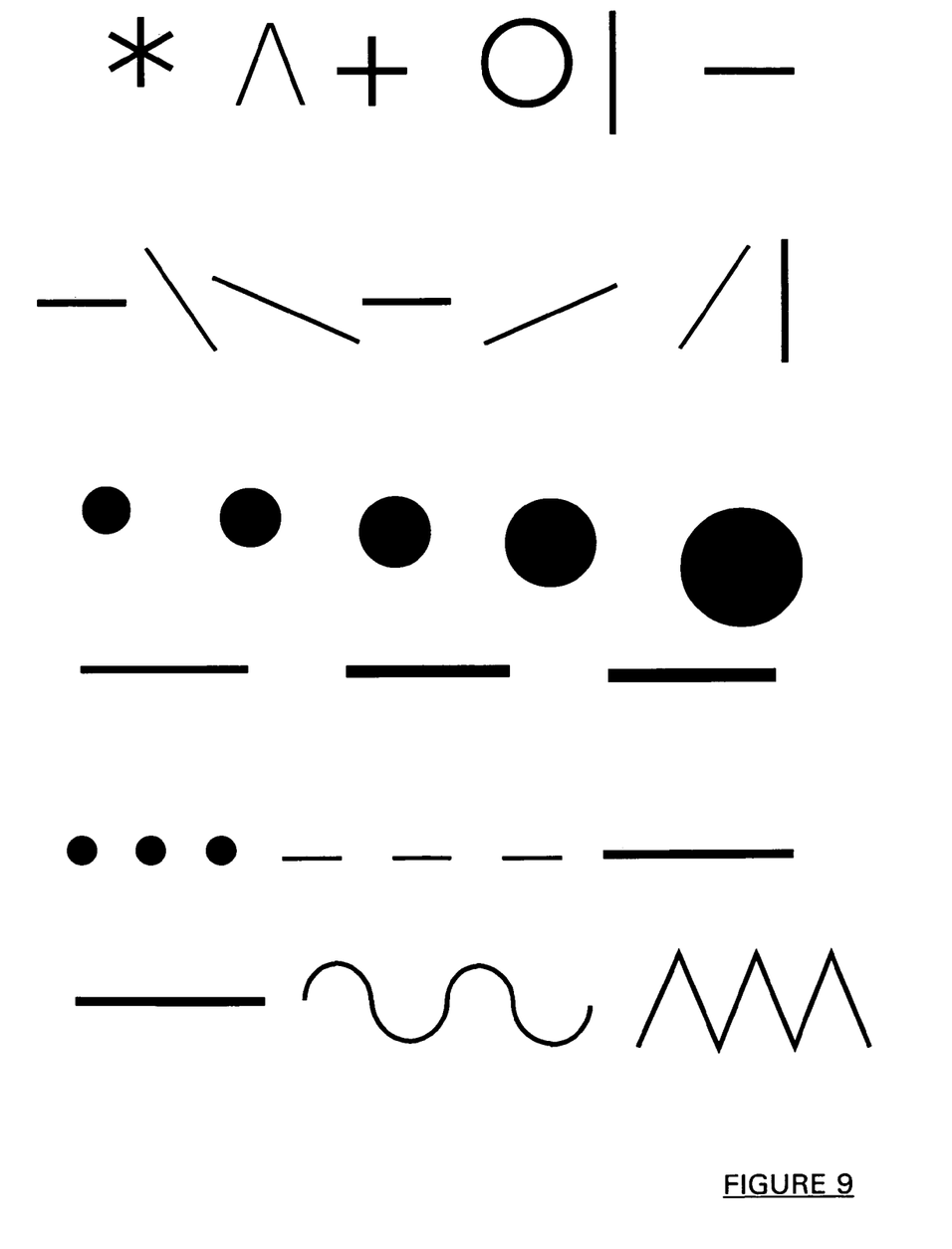
FIG. 9 depicts distinguishing 'dots' by shape, orientation, and size and 'lines' by thickness, duty cycle and transverse perturbations.

The projector/scanner for the grid, dots or other pattern can be from a fixed position; or it can be mounted on the camera, generally centrally on axis with the main high-resolution lens; or separate projectors can be associated with each of the left and right low-resolution cameras, etc. If two or more, they can be illuminated at different times, or they can be co-illuminated if they are of different frequencies (visible colors or distinct invisible bands) or otherwise distinguishable as by shape, thickness, orientation or other visible characteristic (e.g., dotted vs. dashed lines). See FIGS. 8 and 9.

In addition to capturing the grids or other patterns, the low-resolution cameras are optionally used to capture visual image, perhaps at the same time as the main camera, so that: they will have some actual image to 'enhance' with the detail overlaid (with calculated skewing) from the main image or, at least, to guide the distortion process; and/or, so that they will have at least some low-resolution record of 'holes'—i.e., material in the left and right images that is not present in the main central image.

Figure 7:
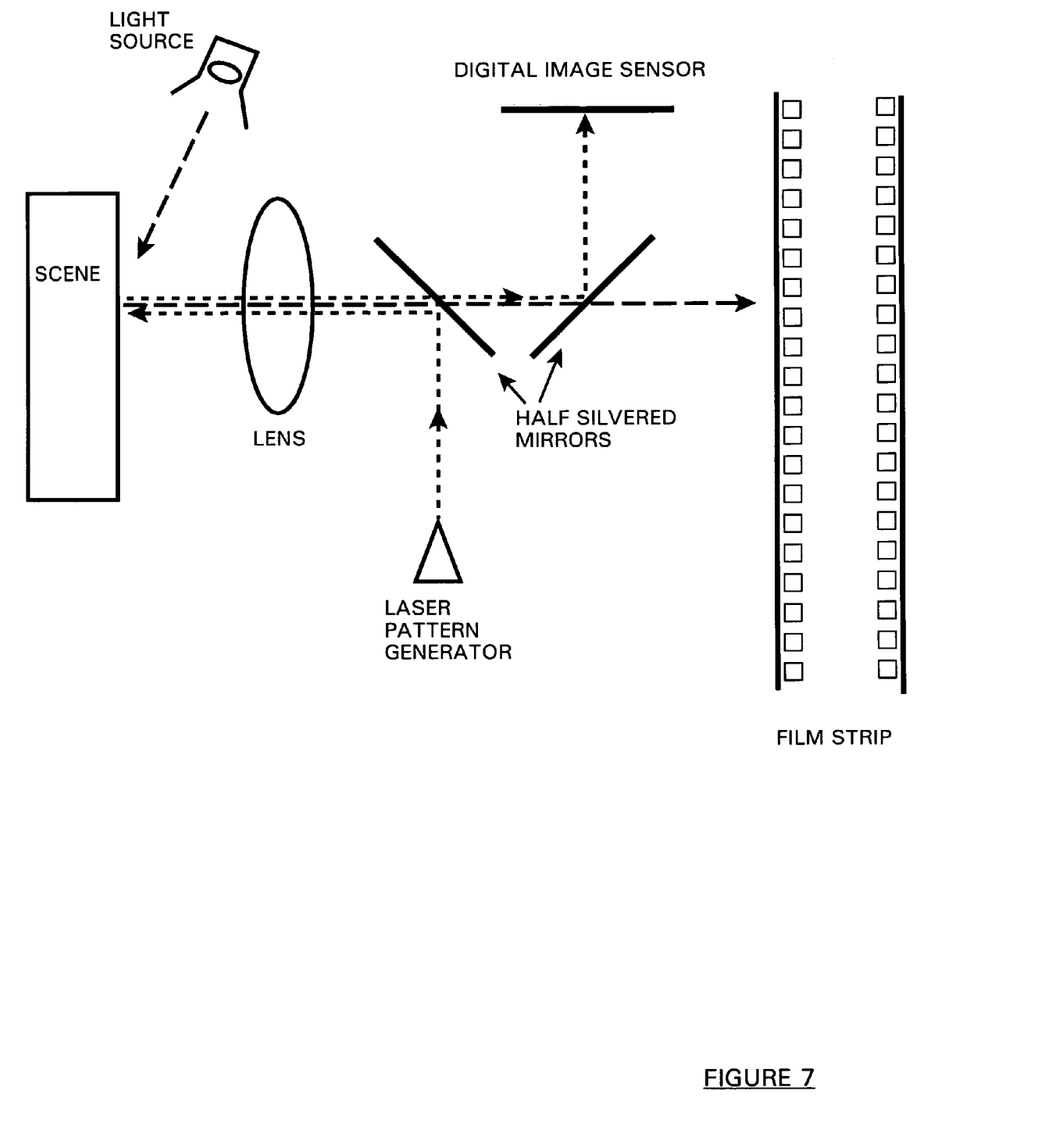
FIG. 7 depicts a beam splitter used for projection, and collection of both visual image and data image information.

Independent of Time-Division Multiplexing of visual image and data image information (e.g., as above), or Frequency Division Multiplexing (e.g., making the projected data outside the visible spectrum), the visual image and data image are, optionally, captured through the same optical path for any of the main or auxiliary cameras. This is achieved, for example, through the use of half-silvered mirrors, prisms, or other beam or optical splitters, to deliver the identical image to (for example) a high-resolution film for visual image recording, and a low-resolution but high-frame-rate digital image sensor for scanned 3D data image recording. Similarly, rather than mounting a projector on or near a camera, in a coordinated fashion, the projection is optionally run through the image capture optics using a similar beam splitting mechanism. See FIGS. 5 and 7.

It should be noted that as some motion capture systems employ wireless radio sensors, rather than optical markers and cameras, it is also feasible to produce an embodiment without auxiliary cameras and, instead, utilizing radio sensors, etc. Then, the 3D data collected will be used in the same way as otherwise, to distort the main image stream into a pair of left and right image streams, or into a single left or right image stream complementary to the main image stream, or for more than two image streams for lenticular displays, or for holographic or VR or gaming systems.

Finally, as is standard practice with commercial implementations of such inventions, it is intended to provide, for a number of popular standard film, HDTV and standard video cameras, well integrated and robust systems that are mechanically and removably mounted directly on the camera, or on usual tripod, steadycam, track or crane mountings; and, which provide auxiliary visual image and data image capture cameras, as well as data pattern projection. Such systems will also provide connections (wired or wireless) to electronically coordinate with pan, tilt, zoom and other controls, as well as shutter or video synchronization timing, and time code. In addition, such systems will optionally include, as needed, additional remote or fixed auxiliary cameras and/or projectors/scanners; as well as passive or active markers. Further, as is standard engineering practice with such systems, they will include optional software for integrated data collection and coordination; and, interfaces to other systems which provide motion capture, motion control and digital animation, compositing, SPFX and other digital imaging capabilities.

Intellectual Property

Inventor has disclosed a number of techniques, some of which incorporate extant technologies (motion capture, motion control, morphing, inbetweening, stereoscopy, computer image synthesis, etc.) and some portions of which may even comprise an inadvertent 're-inventing of the wheel.' To whatever extent a portion of a particular description is not novel, inventor intends to claim as his own that portion which is novel as a distinct invention, or as an improvement to the extant art, or a new use.

The graphics and layouts, algorithms and system designs, steps described in this disclosure and/or depicted in any figure or flow diagram, and other elements disclosed herein, and the text, illustrations and computer program code attached hereto, are exemplary. A number of alternatives for each element have been disclosed, as have specific choices of alternatives comprising some specific preferred embodiments. To whatever degree these alternatives are not in conflict, any and all of the alternatives for any element are practiced, in any combination, with any and all of the alternatives for other elements, in order to create alternative preferred embodiments of the instant invention. Furthermore, certain steps or other elements may be arranged differently, combined, separated, modified or eliminated entirely, without deviating from the intended scope of the invention.

Further, these elements can be combined with elements of other techniques and systems, now in existence or later developed, without deviating from the intended scope of the invention. Additionally, implementing the instant invention by any method of integrating or implementing computer and media systems, now known or later developed, is intended to be within the scope of the instant invention. Similarly, the incorporation into the instant invention of any method of generating, synthesizing, capturing, manipulating, processing, recognizing, displaying, distributing, transmitting or storing information bearing signals and, in particular, images, now known or later developed, is intended to be within the scope of the instant invention.

The flows depicted in the software flow diagrams herein are exemplary, some items may be ordered differently, combined in a single step, skipped entirely, or accomplished in a different manner. However, the depicted flows will work. In particular, some of these functions may be carried out by hardware components, or by software routines residing on, or supplied with, such a component.

Similarly the systems depicted in the system diagrams herein are exemplary, some items may be organized differently, combined in a single element, omitted entirely, or accomplished in a different manner. However, the depicted systems will work. In particular, some of these functions may be carried out by hardware components, or by software routines residing on, or supplied with, such a component.

The contents of the disclosure of this patent document, any attached computer program code, and the accompanying figures, is copyright to the inventors. The copyright owners have no objection to the facsimile reproduction of the patent document or the patent disclosure, as it appears as issued by the Patent and Trademark Office, to the extent permitted by law. Written permission of the copyright holders must be obtained for any other use. Copyright holders otherwise reserve all copyright rights whatsoever, including the right to excerpt, compile or otherwise alter or adapt, or make any other use of, this information.

Further, any names or other identifying phrases or slogans used herein, and any other trademarkable elements are trademarked to the inventors.

In any event, any publication of or about any of the information contained herein must contain appropriate patent, trademark and copyright notices.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying figures shall be interpreted as illustrative and not in a limiting sense.

Now that the invention has been described, what is claimed as new and desired to be secured by Letters Patent is:

1. A process for the production of three-dimensional stereoscopic motion picture visual image information comprising:
   a. capturing at least one primary motion picture information stream;
   b. capturing at least one auxiliary motion picture information stream;
   c. computing at least in part from at least one of said at least one auxiliary motion picture information streams three-dimensional depth information;
   d. creating at least one modified motion picture information stream at least in part by variously distorting the two-dimensional geometry of diverse portions of at least one of said at least one primary motion picture information stream in accordance with said three-dimensional depth information resulting in diverse effects on the parallax of portions of the three-dimensional stereoscopic motion picture visual image information stream created by the association of step e.; and,
   e. associating at least two of said motion picture information streams, further comprising at least one of said at least one modified motion picture information stream, to create a three-dimensional stereoscopic motion picture visual image information stream.

2. A process as in claim 1, wherein:
   f. the operation of steps a. and b. are coordinated with regard to a variable point-of-view during said image stream capture.

3. A process as in claim 1, wherein:
   f. the operation of steps a. and b. are coordinated with regard to variable focal characteristics during said image stream capture.

4. A process as in claim 1, wherein:
   f. system components a. and b. operate in a temporally coordinated fashion during said image stream capture.

5. A process as in claim 1, wherein:
   f. at least one of said at least one primary motion picture information stream is captured at a higher quality in at least some aspect than that of at least one of said at least one auxiliary motion picture information stream.

6. A process as in claim 1, wherein:
   f. the processing of step d. comprises, at least in part, other than optical flow processing.

7. A process as in claim 1, wherein:
   f. motion capture information is applied in step d. in addition to said three-dimensional depth information of step c.

8. A process as in claim 1, wherein:
f. information relating to the configuration of at least one image capture system used to capture at least one of said motion picture information streams is applied in step d. in addition to said three-dimensional depth information of step c.

9. A process as in claim 1, wherein:
f. depth information derived from a computer imaging process is applied in step d. in addition to said three-dimensional depth information of step c.

10. A process as in claim 1, wherein:
f. image information derived from a computer imaging process is used in combination with said three-dimensional stereoscopic motion picture visual image information stream.

11. A process as in claim 1, comprising, in addition:
f. projecting at least one geometric pattern onto at least part of the field within the view captured in at least one motion picture information stream; and,
g. the geometry as captured of at least one of said at least one pattern comprises, at least in part, at least part of the basis of the computing of said three-dimensional depth information of step c.

12. A process as in claim 11, wherein the optical axis of said projection is oriented substantially co-linear with the optical axis of the capture of the associated motion picture information stream.

13. A process as in claim 11, wherein the optical axis of said projection is oriented substantially off-axis in relation to the optical axis of the capture of the associated motion picture information stream.

14. A process as in claim 1, wherein:
f. the computing of step c. comprises, at least in part, the comparison of information from at least two of said motion picture information streams.

15. A process as in claim 1, wherein:
f. the computing of step c. comprises, at least in part, the comparison of information from a single one of said motion picture information streams, captured at least two distinct times.

16. A process as in claim 1, wherein:
f. at least one of said at least one primary motion picture information streams comprises visual image information; and,
g. at least one of said at least one auxiliary motion picture information streams comprises data image information.

17. A process as in claim 1, wherein:
f. as least some visual information derived from at least one of said at least one auxiliary motion picture information streams is used at least in part to fill at least some part of at least one dis-occlusion gap created during the creation of said at least one modified motion picture information stream in step d.

18. A process as in claim 1, wherein:
f. the three-dimensional depth information is exportable for use in conjunction with a second computer imaging system.

19. A process as in claim 1, wherein:
f. at least one of said at least one primary motion picture information stream and at least some of said three-dimensional depth information are communicated from a first system to a second system; and,
g. steps d. and e. are carried out within said second system.

20. A product comprising a three-dimensional stereoscopic motion picture visual image information stream produced at least in part by the process of claim 1, and conveyed upon an information bearing medium.

21. A product comprising the exhibition of a three-dimensional stereoscopic motion picture visual image information stream produced at least in part by the process of claim 1.

22. A system for the production of three-dimensional stereoscopic motion picture visual image information comprising:
a. at least one system component to capture a primary motion picture information stream;
b. at least one system component to capture an auxiliary motion picture information stream;
c. a system component to compute at least in part from at least one of said at least one auxiliary motion picture information streams three-dimensional depth information;
d. a system component to create at least one modified motion picture information stream at least in part by variously distorting the two-dimensional geometry of diverse portions of at least one of said at least one primary motion picture information stream in accordance with said three-dimensional depth information resulting in diverse effects on the parallax of portions of the three-dimensional stereoscopic motion picture visual image information stream created by the association of system component e.; and,
e. a system component to associate at least two of said motion picture information streams, further comprising at least one of said at least one modified motion picture information stream, to create a three-dimensional stereoscopic motion picture visual image information stream.

23. A system as in claim 22, wherein:
f. the operation of system components a. and b. are coordinated with regard to a variable point-of-view during said image stream capture.

24. A system as in claim 22, wherein:
f. the operation of system components a. and b. are coordinated with regard to variable focal characteristics during said image stream capture.

25. A system as in claim 22, wherein:
f. system components a. and b. operate in a temporally coordinated fashion during said image stream capture.

26. A system as in claim 22, wherein:
f. at least one of said at least one system component to capture a primary motion picture information stream operates at a higher quality in at least some aspect than that of at least one of said at least one system component to capture an auxiliary motion picture information stream.

27. A system as in claim 22, wherein:
f. the creation performed by system component d. comprises, at least in part, other than optical flow processing.

28. A system as in claim 22, wherein:
f. said at least one system component to capture a primary motion picture information stream comprises a left and right stereoscopic pair.

29. A system as in claim 22, wherein:
f. said at least one system component to capture an auxiliary motion picture information stream comprises a left and right stereoscopic pair.

30. A system as in claim 22, wherein:
f. said at least one system component to capture an auxiliary motion picture information stream comprises at least one system component mounted upon and operated in coordination with said at least one system component to capture a primary motion picture information stream.

31. A system as in claim 30, wherein:
g. said mounted system component is detachably mounted.

32. A system as in claim 22, wherein:
f. said at least one system component to capture an auxiliary motion picture information stream comprises at least one system component mounted remotely from said at least one system component to capture a primary motion picture information stream.

33. A system as in claim 32, wherein:
g. said at least one system component mounted remotely is operated in coordination with in slave mode to said at least one system component to capture a primary motion picture information stream.

34. A system as in claim 22, further comprising:
f. a system component to capture information relating to the configuration of at least one of said system components used to capture a motion picture information stream; and,
g. that said configuration information is made available to be used by system component c. during the computation of said three-dimensional depth information.

35. A system as in claim 22, comprising in addition:
f. at least one system component to project at least one geometric pattern upon at least part of the field within the view of at least one system component to capture a motion picture information stream.

36. A system as in claim 35, wherein:
g. at least one system component to project at least one geometric pattern comprises a multiplicity of system components separated spatially which project distinct patterns such that the pattern projected from a first such system component can be distinguished from the pattern projected from at least a second such system component.

37. A system as in claim 35, wherein:
g. at least one system component to project at least one geometric pattern comprises a multiplicity of system components separated spatially which project patterns at distinct times.

38. A system as in claim 35, wherein:
g. visual image information and projected geometric patterns are captured, at least in part, in a time division multiplexed fashion.

39. A system as in claim 35, wherein:
g. at least some geometric patterns are both projected and captured, at least in part, along the same optical path.

40. A system as in claim 35, wherein:
g. at least some geometric patterns are projected and at least some visual image information is captured, at least in part, along the same optical path.

41. A system as in claim 22, wherein:
f. said at least one system component to capture a primary motion picture information stream comprises a system component to capture visual image information;
g. said at least one system component to capture an auxiliary motion picture information stream comprises a pair, mounted to the left and right of said system component to capture a primary motion picture information stream;
h. said system component f. operates at a higher quality in at least some aspect than the system components comprising said pair of system components of g.
i. said system components of f. and g. are operated in a coordinated fashion with regard to orientation; and,
j. said system components of f. and g. are operated in a coordinated fashion with regard to optical configuration.

42. A system as in claim 41, wherein:
k. at least one of said system components of g. captures data image information at least some of the time.

43. A motion picture camera system for the production of at least one three-dimensional stereoscopic motion picture visual image information stream comprising:

a. a relatively high-quality motion picture camera to capture a primary motion picture visual image information stream;
b. a pair of relatively lesser-quality in some aspect auxiliary motion picture cameras mounted to the left and right of the central optical input axis of said camera element a. to capture auxiliary streams of motion picture information comprising at least in part binocular stereoscopic information; said binocular stereoscopic information capable of being used to compute at least one stereoscopic depth information stream; said at least one stereoscopic depth information stream capable of being used to process at least in part said primary motion picture visual image information stream to create at least one three-dimensional stereoscopic motion picture visual image information stream;
c. that said cameras operate in a coordinated fashion with respect to a variable point of view during the capture of said motion picture information streams; and
d. that said cameras operate in a temporally coordinated fashion during the capture of said motion picture information streams.

44. The system of claim 43, further comprising:
that system components a. and b. are separable sub-systems integrated for operation.

45. The system of claim 44, further comprising:
that said cameras operate in a coordinated fashion with respect to variable focal characteristics during the capture of said multiple-frame sequences of motion picture visual information streams.

46. The system of claim 44, further comprising:
e. at least one projector of at least one geometric pattern, projecting at least in part onto at least some part of the field within the view of said auxiliary cameras; and, that the information captured by said auxiliary cameras is, at least in part, said at least one geometric pattern.

47. The system of claim 45, further comprising:
e. at least one projector of at least one geometric pattern, projecting at least in part onto at least some part of the field within the view of said auxiliary cameras; and, that the information captured by said auxiliary cameras is, at least in part, said at least one geometric pattern.

48. The system of claim 45, further comprising:
f. a system component to compute at least one stereoscopic depth information stream from said binocular stereoscopic information; and,
g. a system component to create at least one three-dimensional stereoscopic motion picture visual image information stream from said primary motion picture visual image information stream processed using at least in part said at least one stereoscopic depth information stream.

49. The system of claim 43, further comprising:
that said cameras operate in a coordinated fashion with respect to variable focal characteristics during the capture of said multiple-frame sequences of motion picture visual information streams.

50. The system of claim 49, further comprising:
e. at least one projector of at least one geometric pattern, projecting at least in part onto at least some part of the field within the view of said auxiliary cameras; and, that the information captured by said auxiliary cameras is, at least in part, said at least one geometric pattern.

51. The system of claim 43, further comprising:
e. at least one projector of at least one geometric pattern, projecting at least in part onto at least some part of the field within the view of said auxiliary cameras; and, that the information captured by said auxiliary cameras is, at least in part, said at least one geometric pattern.

52. The system of claim 43, further comprising:
e. a system component to compute at least one stereoscopic depth information stream from said binocular stereoscopic information; and,
f. a system component to create at least one three-dimensional stereoscopic motion picture visual image information stream from said primary motion picture visual image information stream processed using at least in part said at least one stereoscopic depth information stream.

* * * * *